June 13, 1961     T. J. ZELLER     2,987,815
METHOD OF ATTACHING CEMENTED CARBIDE FACINGS
TO VALVE LIFTERS AND THE LIKE
Filed June 25, 1957

INVENTOR.
THEODORE J. ZELLER
BY
HIS ATTORNEYS.

United States Patent Office 2,987,815
Patented June 13, 1961

2,987,815
METHOD OF ATTACHING CEMENTED CARBIDE FACINGS TO VALVE LIFTERS AND THE LIKE
Theodore J. Zeller, Allentown, Pa., assignor to Mack Trucks, Inc., Plainfield, N.J., a corporation of New York
Filed June 25, 1957, Ser. No. 667,905
9 Claims. (Cl. 29—487)

This invention relates to methods of securing cemented carbide wearing surfaces on articles and to the resulting articles, and it relates more particularly to methods of attaching cemented carbide faces to valve tappets for internal combustion engines and to the resulting valve tappets.

This is a continuation-in-part of my application Serial No. 357,118, filed May 25, 1953, now Patent 2,817,144, which is a continuation-in-part of application Serial No. 291,482, filed June 3, 1952, now abandoned.

It has been recognized that the tappets of internal combustion engines are subjected to very severe wear because of violent impact and rubbing contact between the cams and the tappets during operation. Because of the rapid wearing of the tappets, it has been customary to provide adjusting mechanisms for taking up the play or "lash" in the valve system or even to include mechanical or hydraulic compensators for wear, expansion and contraction of the tappets and other valve actuating mechanisms.

In order to overcome the wear on such tappets, attempts have been made to secure abrasion-resistant facings to the cam-engaging surfaces of the tappets, such as, for example, cemented carbide facings. The use of cemented carbide, such as tungsten or other carbide, has however, not been successful for the reason that such facings cannot be bonded to the body of the tappet by the prior brazing techniques in such a manner as to withstand the severe operating conditions to which the tappets are subjected, for any substantial period of time.

The difficulties appear to have been twofold. One difficulty is that it has not been possible to obtain a continuous uniform layer of the brazing metal between the tappet body and the cemented carbide facing by conventional brazing techniques. Despite the most careful control of operating conditions, voids occur in the bond and, as a result, weak points are left at which fracture and separation of the carbide facing occurs. The second difficulty is that the bond produced by prior brazing techniques is too weak to withstand the severe conditions of operation to which valve tappets, for example, are subjected.

Cemented carbide facings for tools have been brazed heretofore to steel tool shanks by means of silver solder. For most conditions under which the tools operate, such silver solder brazing is quite satisfactory. However, it has been found that silver solder is unsatisfactory for brazing cemented carbide facings to tools which are subjected to suddenly applied high operating loads. For example, a silver brazed, carbide faced tool operating on an interrupted cut has an extremely short life. A valve tappet is subjected to much the same conditions as a tool on an interrupted cut.

It is recognized that copper brazing metals provide a stronger bond than a silver solder. However, copper brazing metals have not been commonly used because the brazing operation must be conducted at a much higher temperature and the operator is confronted with a cooling range which is nearly twice as great as when using silver solder because of the high melting point of copper.

In brazing with silver solder, a temperature of approximately 1300° F. is employed so that the brazed parts must be cooled about 1200° F. to obtain room temperature. In using copper as a brazing material, the brazing temperature exceeds 2100° F. and thus the cooling range is approximately 2000° F.

The coefficient of thermal expansion of steel is $6.6 \times 10^{-6}$ per degree F. while that of cemented tungsten carbide is $3.3 \times 10^{-6}$ per degree F., or only about half of that of steel. Thus, in brazing with silver solder, the difference in contraction of the steel and the cemented carbide facing in cooling from about 1300° F. to room temperature is on the order of $3.3 \times 10^{-6} \times 1200$ or .00396" per inch. In cooling from 2100° F., in the case of copper brazing, the difference in contraction between the steel of the tappet and the cemented carbide facing is on the order of .0062" per inch. Thus, when using a cemented carbide facing and on a steel article of the same dimension in both cases, the residual stress will be nearly twice as great when using copper as when using silver solder. The dimensions and the configuration of the steel article and the carbide facing likewise introduce added difficulties. Inasmuch as residual stresses will always exist in articles after brazing, irrespective of the brazing metal used, due to the difference in thermal expansion rates of the cemented carbide and steel and likewise the moduli of elasticity of the two components, the operating life of the article is shortened unless some means is provided for eliminating the stresses or neutralizing their effect. In accordance with the present invention, I have discovered that the residual stress in shear between the carbide facing and a steel article to which the facing is brazed can be reduced to insignificance by the use of a brazing material having a suitably high bonding strength.

The present invention involves a unique method of brazing the carbide facing to the tappet which assures a uniform, continuous and extremely strong bond between the facing and the tappet.

More particularly, the invention includes brazing the cemented carbide to the steel supporting member by means of a copper brazing metal in such a manner as to provide an alloy having a bond strength that actually exceeds the stress in shear of the copper brazing metal.

The average stress in shear at rupture of silver solder and annealed copper are relatively close. Thus, the stress in shear of silver solder is 25,000 p.s.i., while the stress in shear of annealed copper is 30,000 p.s.i. In neither of these alloys is the bond strength sufficient to satisfy the requirements of a suitable bonding medium for securing cemented carbide facings to steel tappet bodies. On the other hand, I found that an alloy of copper and iron meets the requirement of strength and thus is suitable for use in accordance with the present invention to enable the production of commercially practical tappets having cemented carbide faces. For example, the shear strength of an annealed copper-iron alloy containing 2½% iron is 57,000 p.s.i. Alloys of copper and iron having a higher iron content than 2½% have even greater resistance to shear. However, when the iron content becomes too high, the ductility of the alloy is too low to afford sufficient impact resistance when subjected to shock. Accordingly, the alloy should not contain much more than about 3% iron or much less than about 2% iron.

A copper-iron alloy can be formed during the brazing operation by appropriate control of the treating conditions, for example, a copper-iron alloy containing between about 2% and 3% iron is formed (in situ) by holding the parts at the proper temperature for sufficient time in a reducing atmosphere. The brazing operation may include melting a slug of brazing metal in such a relation to the tappet body and the carbide facing that the brazing metal flows outwardly between the tappet and the carbide facing to produce a continuous bonding layer throughout the entire opposing areas of the carbide facing and the tappet body. The new brazing method eliminates voids or discontinuities in the bonding layer and produces a strong and uniform bond between the facing and the tappet body.

In order to reduce residual stress after brazing, a controlled cooling rate from brazing temperature must be employed.

Steel heated to above its transformation point $Ac_3$ where its structure changes from body center cubic to face center cubic, abruptly becomes quite plastic and if a brazed tappet is cooled at a sufficiently low rate with a proper bond between the carbide disc and the steel body, the steel deforms plastically until the lower transformation point $Ar_3$ is reached. In the properly selected steel this is approximately at 1300° F., or the temperature used for silver solder brazing.

In order to avoid high residual stress by controlled cooling rate, it is further necessary to control the relative thickness of steel to cemented carbide face. If the thickness of the steel exceeds that of the cemented carbide face by more than 5 to 1, the net shear strength will be greatly reduced. For example, with a cemented carbide disc of $\frac{1}{16}''$ thickness and the steel head of the tappet of $\frac{3}{16}''$, the force required to shear the disc from the tappet is a minimum of 40,000 lbs. If the steel thickness is increased to $\frac{1}{2}''$, this force drops to some 10,000 lbs.

The tappets produced in accordance with the present invention have operating lives far in excess of any heretofore produced and they are so effective and wear resistant that in many types of engines, the carbide faced tappets readily replace hydraulic valve actuators and the like and without involving frequent adjustments of valve clearances.

For a better understanding of the present invention, reference may be had to the accompanying drawing in which.

Figure 1:
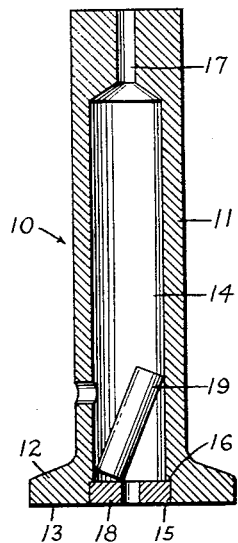
FIG. 1 is a view in longitudinal section through a valve tappet in partially completed form illustrating one step of the method embodying the present invention.

The invention will be described with reference to manufacture of valve tappet, such as is used in an internal combustion engine. It will be understood, however, that the method described hereinafter can be used for the manufacture of other articles in which a hard, wear-resisting surface of cemented carbide is advantageous. Referring now to FIG. 1 of the drawing, it shows a typical valve tappet body 10 formed of steel or the like. The tappet body 10 includes a stem 11 and a head 12 which may be of disc-like formation having a substantially flat outer face 13. The stem 11 has a central bore 14 which is in alignment with a somewhat larger bore or recess 15 in the face 13 of the head 12 providing a shoulder 16 at the junction of the bores. The opposite end of the stem has a smaller bore 17 therein which communicates with the larger bore 14. The recess 15 receives a perforated disc 18 formed of steel or the like. The disc has a press fit in the bore 15.

Figure 2:
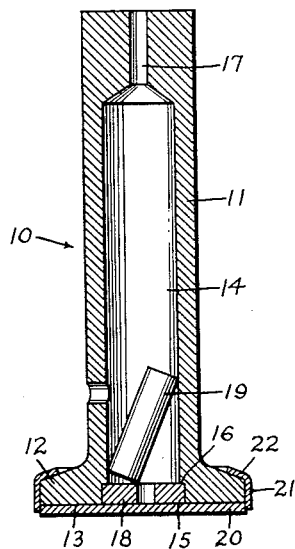
FIG. 2 is a view in longitudinal section through a valve tappet disclosing the assembled tappet and facing at another stage of the method.
Figure 3:
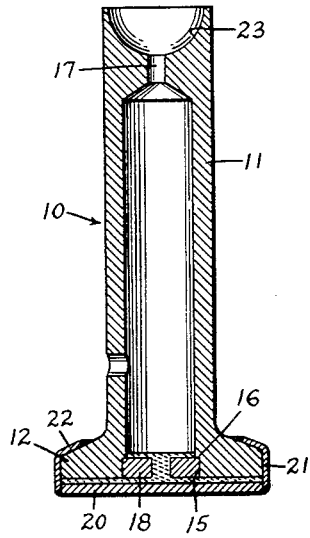
FIG. 3 is a view in section through a completed tappet embodying the present invention.

Starting with the tappet body 10, a slug 19 of brazing copper rod or wire is introduced into the bore 14 and the disc 18 is then pressed into the bore 15 to retain the slug in the stem. All of the parts are degreased, for example, in a vapor degreasing apparatus of known type. The face 13 of the tappet is then machined flat without the use of a lubricant. The tappet body is now in a condition to receive a cemented carbide facing 20 which, as illustrated in FIG. 2, may consist of a flat disc of tungsten carbide of about the same dimensions as the face 13 of the tappet body. The thickness of the carbide disc should be at least one-fifth of the thickness of the head 12 of the tappet body. In preparing the disc for attachment to the valve body, it is grit blasted on one surface with a silicon carbide grit about No. 60 in size, in order to slightly roughen the back surface of the disc. The disc is then degreased in a vapor degreaser and the roughened surface of the disc 20 is then placed against the face 13 of the tappet body where it is held in position by means of the shroud 21. The shroud 21 consists of a thin steel ring having an in-turned flange 22 which bears against the back surface of the head 12 of the tappet. The opposite edge of the ring 21 at least partially overlies the edge of the carbide facing disc 20. The edge of the shroud overlying the edge of the disc may be spun in at about an angle of about 8° to engage the edge of the disc 20 and hold the latter tightly against the face 13 of the tappet body.

The facing disc 20 is bonded to the tappet body 10 in the following manner. The assembled tappet body 10, shroud 21 and facing disc 20 are placed in a furnace with the stem upright and the assembly resting on the disc 20. The temperature of the assembled tappet is raised at a rate not exceeding about 180° F. per minute to above the melting point of the copper slug. The brazing operation is conducted in an atmosphere of dry hydrogen or other reducing gas to prevent oxidation of the copper and the steel. A temperature of 2100° F. to 2150° F. has been found satisfactory for the brazing operation. At the brazing temperature, the copper slug is melted and flows out through the hole in the retaining disc or plug 18 and radially outwardly between the face 13 of the tappet body and the adjacent face of the carbide disc. Also, due to capillary attraction, the copper will flow outwardly between the edge of the disc 20 and the shroud 21 and upwardly and downwardly between the shroud and the edge of the disc 20 and back of the valve head 12, thereby producing a continuous fillet of copper around each edge of the shroud 21, and showing that the copper has formed a continuous layer of film between the opposing faces of the valve body and the carbide disc and also between the shroud, the disc and the valve body. The tappet is held at brazing temperature for about 20 minutes to form a copper-iron alloy containing about 2.25% to 2.50% iron by alloying of the steel of the tappet body and the copper brazing metal. The iron content of the alloy can be changed by heating a greater or lesser time than 20 minutes. When the desired copper-iron alloy has been formed, the tappet is cooled to room temperature at a substantially constant rate not exceeding 150° F. per minute. During cooling to about 1300° F. the plasticity of the steel allows it to be deformed without setting up any residual stresses in the bond while the stresses that result in cooling below 1300° F. are of no major importance as compared to the high bond strength.

The copper-iron alloy acts not only to braze or bond the disc to the face of the tappet head 12, but it also forms a strong mechanical bond extending into the body of the tappet itself. When the copper freezes during cooling, some of it will freeze within the tappet stem and within the hole in the disc 18, so that a strong, rigid mechanical connection between these elements and the facing 20 is obtained.

At the conclusion of the brazing operation, the tappet may be hardened as required and the cup 23 for receiving the ball end of a push rod may be machined in the stem 11. Also, the stem of the tappet may be ground to within the required tolerances and the edge of the carbide face rounded or beveled.

The resulting valve tappets, under test, have shown little or no wear when subjected to normal operating conditions in an internal combustion engine over long periods of time and failure or fracture of the carbide facing has been entirely eliminated because of the strong bond between the facing and the valve head, as well as the lack of stresses in the facing itself.

While the invention has been described with reference to valve tappets in which it has especially great utility, it will be understood that the method may be used with equally good results to secure carbide facings to, and wear resisting inlays in, other articles which are subjected to abrasion and impact. Therefore, the method and the article described herein should be considered as illustrative and not as limiting the scope of the following claims.

I claim:

1. A method of brazing a cemented carbide facing to a ferrous metal backing comprising placing a cemented carbide facing adjacent to a ferrous metal article, placing a copper brazing metal in position to flow between said facing and said article when melted, heating the article and facing to a temperature higher than the melting point of the brazing metal to melt it and cause it to flow between said facing and said article, maintaining the article and the facing at a temperature above the melting point of the brazing metal to form a bonding layer of a copper-iron alloy containing between about 2% and 3% iron between the facing and the article, and thereafter cooling the article, layer and facing to solidify the bonding layer and unite the facing to the article.

2. The method set forth in claim 1 in which the article, bonding layer and facing are cooled at a substantially uniform rate not exceeding about 150° F. per minute to minimize the residual stresses in the bonding layer.

3. The method set forth in claim 1 in which the article and facing are heated in an atmosphere of reducing gas.

4. The method set forth in claim 1 in which the article and facing are heated from about room temperature to the melting point of the brazing metal at a rate not exceeding about 180° F. per minute.

5. The method set forth in claim 1 in which the thickness of the carbide facing exceeds one-fifth the thickness of the portion of the article adjacent thereto.

6. A method of brazing a cemented carbide facing to a steel valve tappet body having a hollow stem and an enlarged head having a centrally located opening communicating with the interior of said stem, comprising introducing a piece of copper brazing metal into said hollow stem, placing the tappet body on said facing with the head of said body engaging said facing, heating the facing and tappet body to a high enough temperature to melt the brazing metal and allow it to flow through said opening between and into contact with said head and said facing, continuing said heating to convert said brazing metal into a iron-copper alloy containing between about 2% and 3% iron, and thereafter cooling said body and facing to solidify said alloy and bond the facing to said body.

7. The method set forth in claim 6 in which the heating is continued to form an iron-copper alloy containing between about 2.25% and 2.5% iron.

8. The method set forth in claim 6 in which the body and facing are cooled at a substantially uniform rate not exceeding about 150° F. per minute.

9. The method set forth in claim 6 in which the ratio of the thickness of the facing to the thickness of the head on the tappet body exceeds 1 to 5.

References Cited in the file of this patent

UNITED STATES PATENTS

| | | |
|---|---|---|
| 1,860,275 | Chapin | May 24, 1932 |
| 2,209,709 | Weatherhead | July 30, 1940 |
| 2,373,117 | Hobrock | Apr. 10, 1945 |
| 2,464,591 | Larsen et al. | Mar. 15, 1949 |
| 2,467,596 | Pratt | Apr. 19, 1949 |
| 2,474,643 | Webb | June 28, 1949 |
| 2,633,633 | Bogart et al. | Apr. 7, 1953 |
| 2,671,958 | Block | Mar. 16, 1954 |
| 2,683,671 | Findlay et al. | July 13, 1954 |
| 2,759,446 | Ewing | Aug. 21, 1956 |
| 2,817,144 | Zeller | Dec. 24, 1957 |
| 2,844,868 | Cline et al. | July 29, 1958 |
| 2,863,211 | Wellman | Dec. 9, 1958 |